United States Patent [19]
Denley

[11] Patent Number: 5,359,499
[45] Date of Patent: Oct. 25, 1994

[54] VERTICAL/HORIZONTAL INDICATOR FOR A VEHICULAR HEADLAMP

[75] Inventor: Ronald S. Denley, Woodstock, Ill.

[73] Assignee: Elco Industries, Inc., Rockford, Ill.

[21] Appl. No.: 154,604

[22] Filed: Nov. 18, 1993

[51] Int. Cl.$^5$ .............................................. F21M 3/20
[52] U.S. Cl. ..................................... 362/66; 362/273;
362/284; 362/289; 362/324; 362/419; 33/384;
33/385; 33/335; 33/288; 33/389
[58] Field of Search ................. 362/66, 421, 419, 324,
362/289, 273, 428, 287; 33/379, 335, 288, 333,
383, 384, 385, 386, 387, 388, 389

[56] References Cited
U.S. PATENT DOCUMENTS

| | | | |
|---|---|---|---|
| 5,029,051 | 7/1991 | Shirai et al. | 362/66 |
| 5,032,964 | 7/1991 | Endo et al. | 362/61 |
| 5,055,980 | 10/1991 | Mochizuki | 362/61 |
| 5,067,056 | 11/1991 | Suzuki et al. | 362/66 |
| 5,150,958 | 9/1992 | Miyazawa et al. | 362/66 |
| 5,151,849 | 7/1992 | Nagengast et al. | 33/335 |

Primary Examiner—Ira S. Lazarus
Assistant Examiner—Thomas M. Sember
Attorney, Agent, or Firm—Leydig, Voit & Mayer

[57] ABSTRACT

The reflector of the headlamp is pivotally supported within a housing for vertical tilting about a horizontal axis and for horizontal pivoting about a vertical axis. A bubble level is carried by the reflector and may be adjusted relative thereto to a level position after the reflector has been tilted about the horizontal axis to establish proper vertical aiming of the headlamp beam. A horizontal indicator is located at the same inspection position as the bubble level and may be adjusted to a zero setting after the reflector has been pivoted about the vertical axis to establish proper horizontal aiming of the beam. Part of a mounting platform for the bubble level also serves as part of an indicating scale for the horizontal indicator.

13 Claims, 3 Drawing Sheets

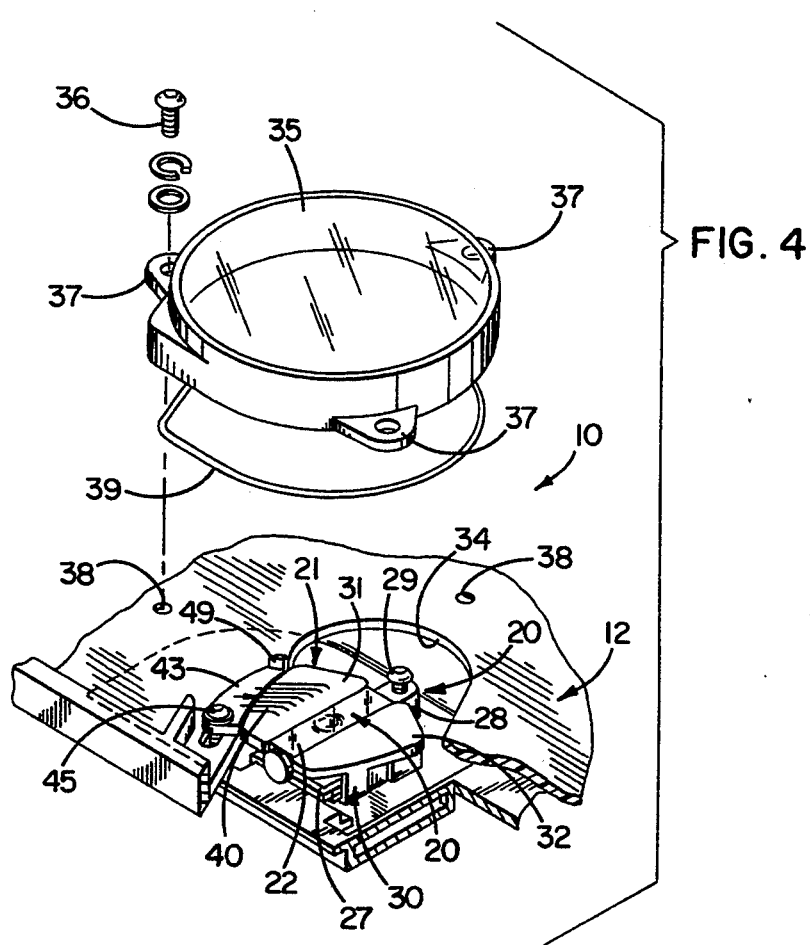
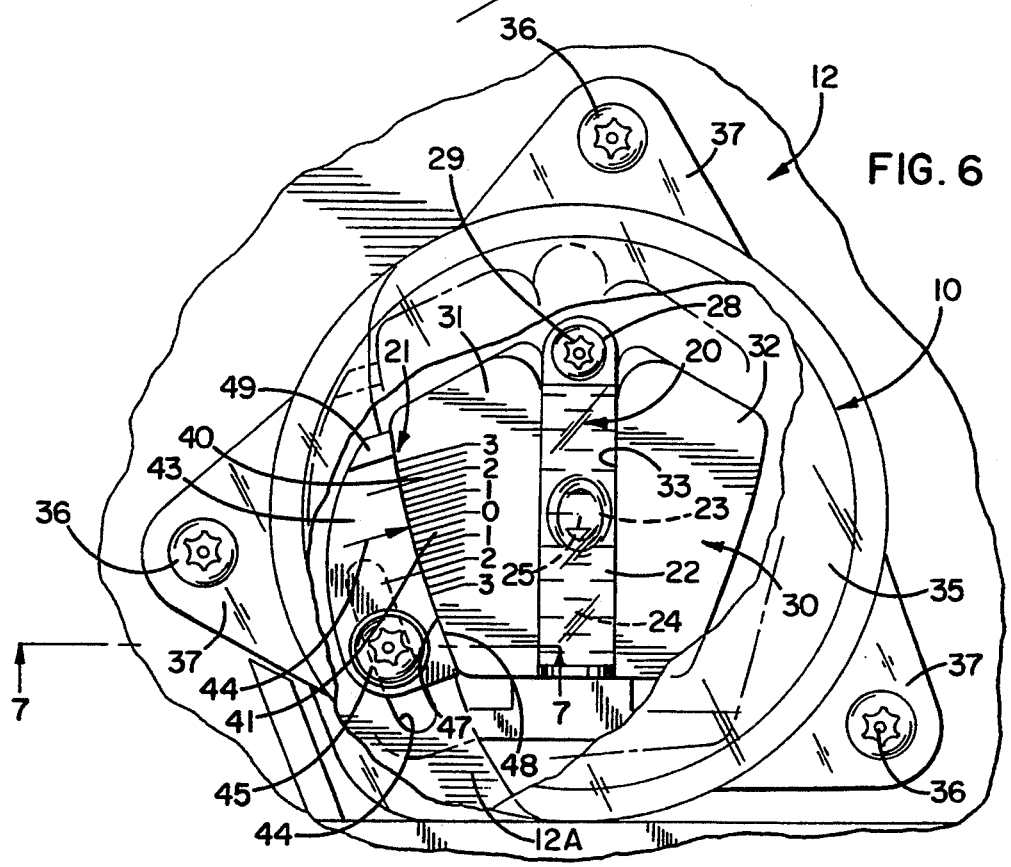

VERTICAL/HORIZONTAL INDICATOR FOR A VEHICULAR HEADLAMP

BACKGROUND OF THE INVENTION

This invention relates generally to indicating apparatus for use in conjunction with a vehicular headlamp in order to enable the beam of the headlamp to be reaimed to a predetermined factory setting.

Modern headlamps include a fixed component and a movable component (e.g., a reflector) which is adapted to be adjusted about vertical and horizontal axes relative to the fixed component in order to establish proper aiming of the headlamp beam. At the vehicle assembly plant, the movable headlamp component is tilted about a horizontal axis to establish proper aim of the beam in a vertical direction and is tilted about a vertical axis to establish proper aim of the beam in horizontal or lateral direction. In some vehicles, the movable headlamp component carries an indicator in the form of a bubble level which, after the beam has been properly aimed in the vertical direction, is adjusted by vertical tilting in order to "zero" the bubble at the preset vertical position of the headlamp. The headlamp also includes a horizontal indicator which is calibrated to a zero setting once the beam has been factory set to the proper horizontal aim. If the headlamp subsequently becomes improperly aimed during service use, the two indicators may be used to determine when the lamp has been adjusted back to the factory preset position.

In prior headlamps, the two indicators are separate devices which often are located remotely from one another. As a result, reading of the indicators both during initial setting and during subsequent adjustment of the headlamp is inconvenient. Moreover, the provision of two separate indicators is relatively expensive.

SUMMARY OF THE INVENTION

The general aim of the present invention is to provide new and improved apparatus in which the vertical and horizontal indicators are substantially incorporated into one unit located in a single inspection area so as to facilitate reading of the indicators and to reduce the cost of the overall apparatus.

A more detailed object of the invention is to use a portion of the mounting platform of the vertical indicator to form part of the indicating scale of the horizontal indicator and thus advantageously utilize the mounting platform to perform two functions.

The invention also resides in the provision of a single transparent cover for enclosing the indicators and in the unique manner of effecting adjustment of the horizontal indicator.

These and other objects and advantages of the invention will become more apparent from the following detailed description when taken in conjunction with the accompanying drawings.

BRIEF DESCRIPTION OF THE DRAWINGS

FIG. 4 is a perspective view of the indicating apparatus and shows the cover exploded away therefrom.

FIG. 6 is an enlarged view similar to FIG. 5 but shows part of the cover broken away.

Figure 1:
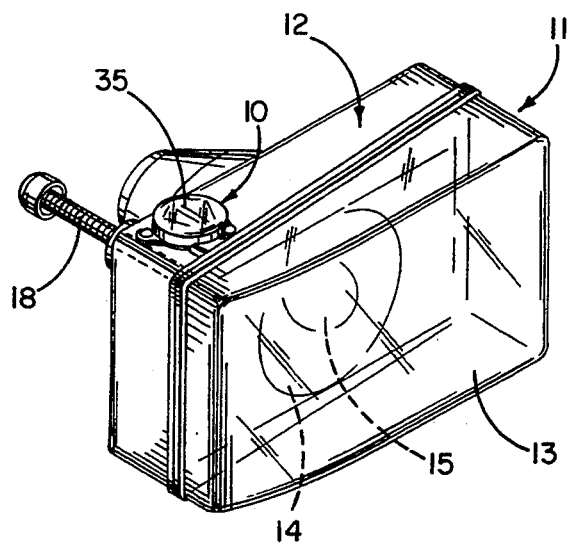
FIG. 1 is a perspective view of a typical headlamp equipped with new and improved indicating apparatus incorporating the unique features of the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as incorporated in apparatus 10 for indicating the vertical and horizontal tilt of a component of a vehicular headlamp 11 in order to establish proper aiming of the headlamp beam. In this particular instance, the headlamp has been shown as comprising a fixed housing component 12 whose forward end is closed by a light-transmitting lens 13. Supported within the housing is a generally parabolic reflector 14 which encircles an electric lamp 15. The reflector is a movable component which, when tilted upwardly and downwardly about a generally horizontal axis, changes the vertical aim of the beam from the lamp. When the reflector is tilted laterally about a generally vertical axis, it changes the lateral or horizontal aim of the beam.

Figure 3:
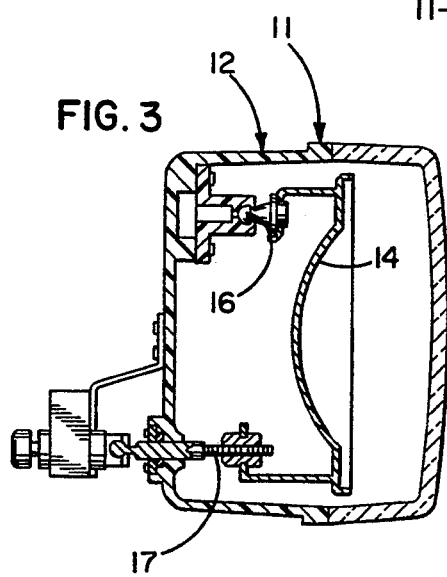
Figure 5:
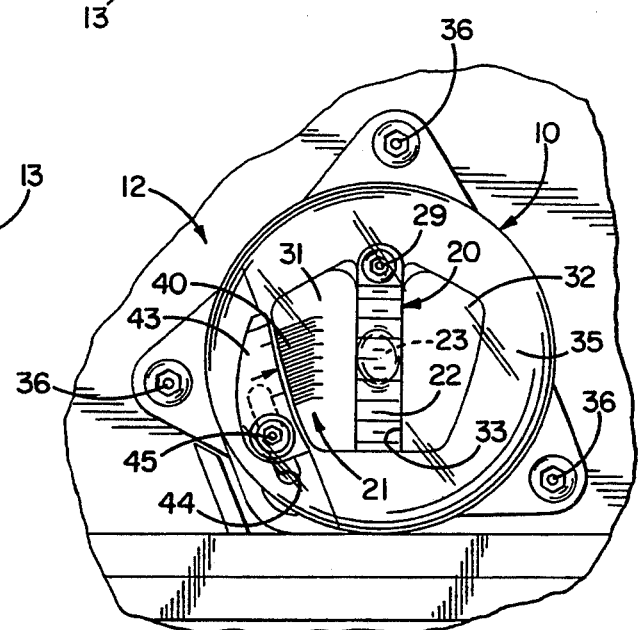
FIG. 5 is a top plan view of the cover and the indicating apparatus.

The apparatus for supporting and adjusting the reflector 14 in the housing 12 does not form part of the present invention and thus will be described only briefly herein. As shown in FIG. 3, the upper rear end portion of the reflector is coupled to the housing by a ball and socket pivot connection 16. Located below the pivot connection and connected between the housing and the reflector is an adjusting mechanism 17 which may be manually adjusted to tilt the reflector upwardly or downwardly about a horizontal axis extending laterally through the pivot connection.

Figure 2:
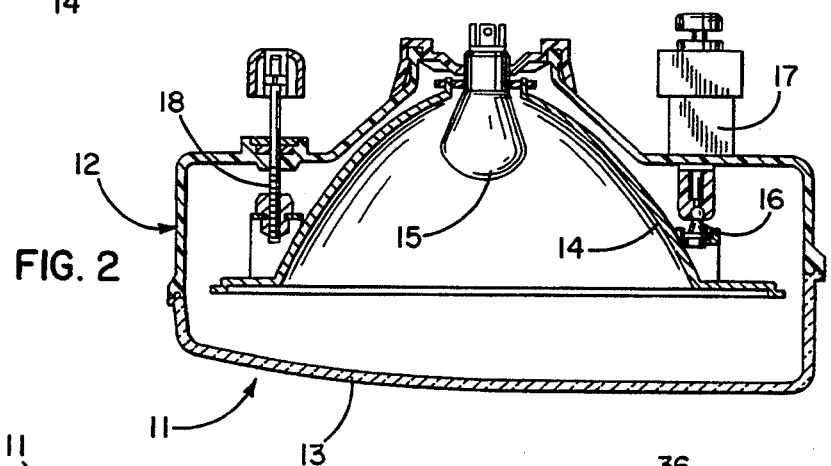
FIGS. 2 and 3 are enlarged cross-sections taken horizontally and vertically, respectively, through the headlamp of FIG. 1.

Located on the side of the reflector 14 opposite the adjuster 17 is a second adjusting mechanism 18 (FIG. 2) which is connected between the housing 12 and the reflector about midway along the height thereof. When the adjusting mechanism 18 is adjusted manually, the reflector is swung laterally about a vertical axis extending through the pivot connection 16 so as to establish the lateral or horizontal aim of the light beam.

At the vehicle assembly plant, the adjusters 17 and 18 are actuated so as to locate the reflector 14 in a position establishing proper aiming of the beam. Thereafter, vertical and horizontal indicators 20 and 21 are calibrated in order to establish settings for the indicators when the beam is properly aimed. If the reflector subsequently moves and causes misaiming of the beam, the adjusters may be actuated to shift the reflector until the indicators return to their initial settings to inform that the reflector has been returned to its original factory-set position.

In accordance with the present invention, the indicators 20 and 21 are located at a single inspection area and are substantially combined into a single unit. As a result, viewing of the indicators is easy and convenient and, in addition, the indicators may be manufactured and assembled at relatively low cost.

More specifically, the vertical indicator 20 is a bubble level of the same general type as disclosed in Denley U.S. application Ser. No. 08/085,650, filed Jun. 30, 1993, the disclosure of which is incorporated herein by reference. The bubble level 20 includes an elongated vial 22 molded of transparent plastic and filled with liquid having a gas bubble 23 therein. A graduated scale 24 (FIG. 6) underlies the vial and contains lines or indicia indicating the position of the bubble in the vial. When the vial is in a horizontal or level position, the bubble is centered over a zero graduation 25 on the scale. Numbers associated with the other graduations indicate the angular distance in degrees (or fractions thereof) through which the vial must be tilted in order to bring the bubble to the level position.

Molded integrally with the vial is a plastic base 27 (FIG. 4) having a rear nose 28. For a purpose to be explained subsequently, an adjusting screw 29 is threaded into and extends through the nose.

The bubble level 20 is supported by a platform 30 (FIGS. 4 and 9) which is secured to or may be an integral part of the reflector 14. Herein, the platform includes two laterally spaced plate members 31 and 32 which together define an elongated slot 33 (FIG. 6) for receiving the vial 22, the upper surfaces of the plates and the upper surface of the vial being disposed in substantially the same plane. A retaining bracket (not shown) made of spring metal is secured to the base 27 of the bubble level 20 and serves to fasten the bubble level to the platform 30. The retaining bracket includes two spring legs which straddle the vial 22 and which engage the undersides of the plates 31 and 32 in such a manner as to bias the rear end of the vial in a downward direction. Reference is made to the aforementioned Denley application for a more detailed disclosure of the bubble level 20 and particularly the base 27, the platform 30 and the spring metal retaining bracket thereof.

The bubble level 20 is located beneath a relatively large inspection opening 34 (FIG. 4) formed in the upper side of the housing 12. A generally circular cover 35 made of transparent plastic closes the inspection opening and is secured to the housing by screws 36 extending through apertured ears 37 of the cover and threaded into holes 38 (FIG. 4) in the housing, a gasket 39 establishing a water and dirt tight seal between the cover and the housing. The cover preferably has optical magnifying properties so as to enable the numbers and graduations of the scale 24 to be more easily read.

After the reflector 14 has been properly aimed in the vertical direction by actuation of the adjuster 17, the vial 22 is tilted into a position centering the bubble 23 over the zero mark 25. For this purpose, the screw 29 is rotated either clockwise or counterclockwise in order to tilt the rear end of the vial either upwardly or downwardly. When the screw is rotated clockwise, its lower end bears against a portion of the retaining bracket which, in turn, bears against the reflector 14 to cause the rear end of the vial to be tilted upwardly. When the screw is rotated counterclockwise, the spring legs of the bracket act between the base 27 and the plates 31 and 32 to effect downward tilting of the rear end of the vial.

Once the bubble level 20 has been adjusted to place the bubble 23 in the zero position, the factory set vertical position of the reflector 14 in effect is visually stored. If the reflector subsequently loses its vertical alignment, that fact can be ascertained by viewing the out-of-zero bubble. The reflector then may be restored to its factory set vertical position by actuating the adjuster 17 in the proper direction and through a sufficient distance to bring the bubble back to a centered position over the zero graduation 25.

Pursuant to the invention, the plate 31 of the mounting platform 30 for the bubble level 20 also serves as part of the horizontal indicator 21. For this purpose, the upper side of the plate 31 includes indicia in the form of a scale 40 (FIG. 6) having a zero mark 41 and having graduations on both sides of the zero mark to form a vernier scale for accuracy. Located in edge-to-edge relation with the plate 31 is another plate 43 having indicia in the form of an arrow 44 positioned to point toward the graduations on the scale 40. The upper sides of the plates 31 and 43 are located in substantially the same plane.

Figure 7:
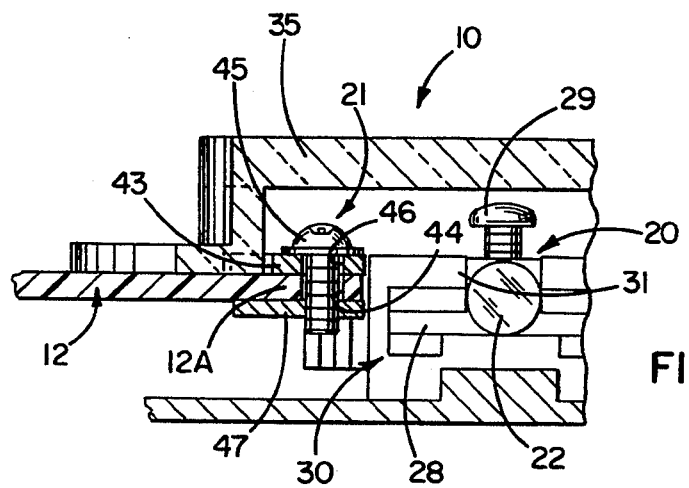
FIG. 7 is a fragmentary cross-section taken substantially along the line 7—7 of FIG. 6.

The plate 43 is supported by a portion 12A (FIGS. 6 and 7) of the housing 12 and overlies an elongated slot 44 formed vertically through the housing portion 12A. A screw 45 extends through a circular hole 46 (FIG. 7) in the plate 43, through the slot 44 and is threaded into a plate-like nut 47 located below the housing portion 12A. When the screw 45 is tightened, the plate 43 is clamped downwardly against the housing portion 12A. By loosening the screw, the plate 43 may be adjusted relative to the housing 12 and the plate 31.

As shown most clearly in FIG. 6, the plate 31 is formed with an arcuately curved convex outboard edge 47 while the plate 43 is formed with a complementary curved concave inboard edge 48. Both edges are curved on an arc which is struck about a center lying on the vertical pivot axis defined by the ball and socket pivot connection 16. Thus, when the reflector 14 is pivoted by the adjuster 18 to change the horizontal aim of the beam, the outboard edge 47 of the plate 31 remains concentric with and close to the inboard edge 48 of the plate 43.

After the proper horizontal aim has been established at the factory by means of the adjuster 18, the screw 45 is loosened and the plate 43 is shifted relative to the plate 31 in order to bring the arrow 44 into alignment with the zero mark 41 on the scale 40. The screw moves along the slot 44 during such shifting and, when subsequently tightened, holds the plate 43 such that the arrow 44 is aligned with the zero mark 41. If the beam later becomes horizontally misaligned, the adjuster 18 is actuated until the zero mark 41 again registers with the arrow 44 to indicate that the reflector 14 has been returned to the factory setting.

The slot 44 is curved on an arc which is struck from a center lying on the vertical axis of the ball and socket connection 16. As a result, the edge 48 of the plate 43 remains concentric with and in close proximity to the edge 47 of the plate 31 when the plate 43 is adjusted. An upstanding lug 49 is formed on the rear end of the plate 43 to facilitate manual adjustment thereof.

From the foregoing, it will be apparent that the present invention brings to the art new and improved headlamp indicating apparatus 10 in which the vertical and horizontal indicators 20 and 21 are both located in a single inspection position and may be easily seen from the top of the housing 12. Because the plate 31 of the mounting platform 30 of the indicator 20 also contains the scale 40 for the indicator 21, the apparatus may be manufactured and assembled at relatively low cost.

Figure 8:
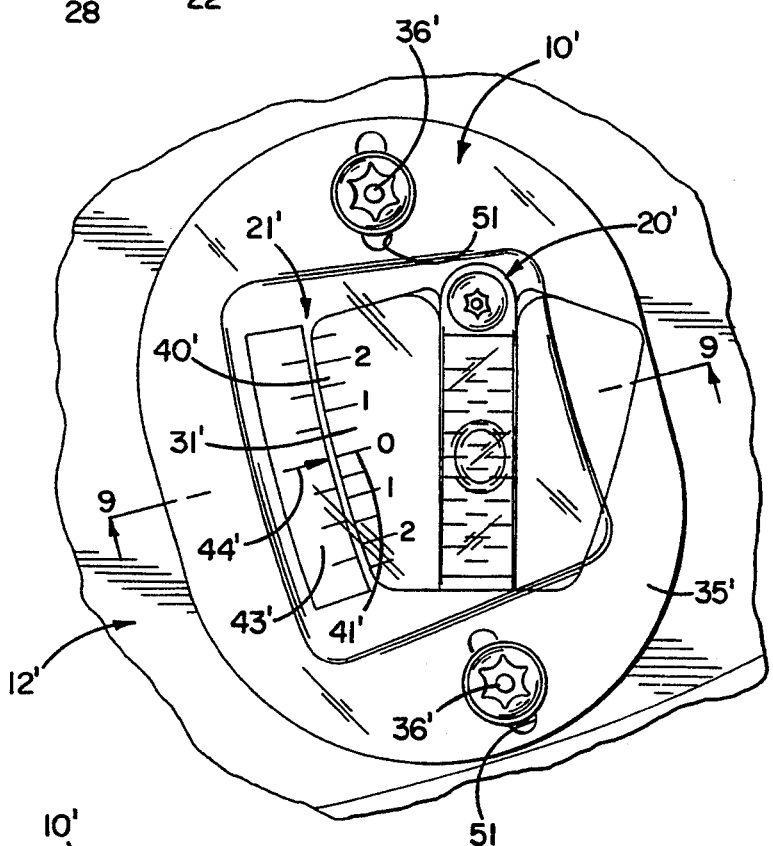
FIG. 8 is a view similar to FIG. 6 but shows modified indicating apparatus.
Figure 9:
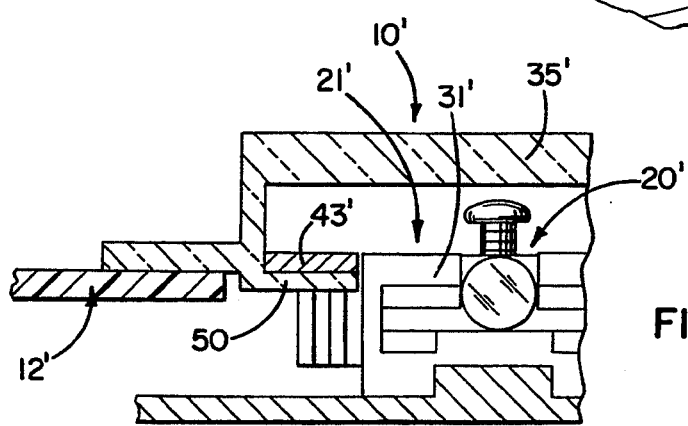
FIG. 9 is a fragmentary cross-section taken substantially along the line 9—9 of FIG. 8.

Modified indicating apparatus 10' is shown in FIGS. 8 and 9 in which parts corresponding to those of the first embodiment are indicated by the same but primed reference numerals. In the apparatus 10' the plate 43' for the horizontal indicator 21' is supported by the upper side of a lip 50 (FIG. 9) formed integrally with and projecting inwardly from the lower side of the cover 35', the upper side of the plate 43' lying in the same plane as the upper side of the plate 31'. The cover is fastened to the upper side of the housing 12' by two screws 36' which extend through circular holes in the cover and through elongated slots 51 in the housing 12'. Nuts (not visible) on the lower ends of the screws clamp the cover to the housing.

After the cover 35' has been installed, horizontal adjustment by the adjuster 18 may be effected before the screws 36' are completely tightened. Once the plate 43' has been positioned to bring the arrow 44' into alignment with the zero mark 41' of the scale 40' the screws are fully tightened to lock the plate and the cover in place. The slots 51 are curved about a center lying on the vertically extending pivot axis 16 of the reflector 14 in order to keep adjacent edges of the plates 31' and 43' during adjustment of the cover 35' and the plate 43'.

I claim:

1. Apparatus for providing a visual indication of the horizontal and vertical orientation of a movable component of a headlamp assembly having an electric lamp and having a fixed component supporting said movable component for selective tilting about a generally horizontal axis and about a generally vertical axis, said apparatus comprising a liquid-filled vial mountable on said movable component and having a gas bubble therein, said vial being spaced laterally in one direction from said lamp, indicia associated with said vial and coacting with said bubble to provide a visual indication of the vertical orientation of said movable component about said horizontal axis, means for selectively tilting one end portion of said vial upwardly and downwardly about a generally horizontal axis relative to said movable component thereby to enable said bubble to be located in a predetermined position relative to said indicia, first and second coacting members supported by said movable and fixed components, respectively, said first member being located closely adjacent said vial and being spaced laterally from said lamp in the same direction as said vial, said first member being movable with said movable component, coacting indicia on said first and second members for providing a visual indication of the horizontal orientation of said movable component about said vertical axis, and means for mounting said second member on said fixed component for selective and generally horizontal adjustment relative to said fixed component and said first member thereby to enable the indicia on said second member to be located in a predetermined position relative to the indicia on said first member.

2. Apparatus as defined in claim 1 further including a cover made of transparent material supported by said fixed component and overlying said vial and said first and second members whereby the indicia associated with said vial and the indicia on said first and second members may be viewed through said cover.

3. Apparatus as defined in claim 2 in which said cover has optical magnifying properties thereby to enable said indicia to be viewed on an enlarged scale.

4. Apparatus as defined in claim 1 further including a third member integral with said first member and supported by said movable component, said first and third members coacting to define an elongated slot for receiving said vial.

5. Apparatus as defined in claim 1 in which said means for mounting said second member for selective adjustment comprise a screw extending through said second member and into said fixed component, and an elongated slot in one of said second member and said fixed component and receiving said screw whereby said second member may be adjusted relative to said first member when said screw is loosened.

6. Apparatus as defined in claim 5 in which said slot is in said fixed component, a nut on said screw and normally clamping said second member to said fixed component, said screw being adjustable along said slot when said screw is loosened relative to said nut.

7. Apparatus as defined in claim 2 in which said second member is fixed securely to said cover, said means for mounting said second member for selective adjustment comprising means for mounting said cover for selective and generally horizontal adjustment relative to said fixed component.

8. Apparatus as defined in claim 7 in which said means for mounting said cover for selective adjustment comprise screw means extending through said cover and into said fixed component, and elongated slot means in one of said cover and said fixed component and receiving said screw means whereby said cover may be adjusted relative to said fixed component when said screw means is loosened.

9. Apparatus as defined in claim 8 in which said slot means is in said fixed component, nut means on said screw means and normally clamping said cover to said fixed component, said screw means being adjustable along said slot means when said screw means is loosened relative to said nut means.

10. Apparatus for providing a visual indication of the horizontal and vertical orientation of a movable component of a headlamp assembly having a fixed component supporting said movable component for selective tilting about a generally horizontal axis and about a generally vertical axis, said apparatus comprising a liquid-filled vial mountable on said movable component and having a gas bubble therein, indicia associated with said vial and coacting with said bubble to provide a visual indication of the vertical orientation of said movable component about said horizontal axis, first and second integral plates located on opposite sides of said vial and defining a slot which receives said vial, means for selectively tilting one end portion of said vial upwardly and downwardly in said slot about a generally horizontal axis relative to said movable component thereby to enable said bubble to be located in a predetermined position relative to said indicia, a plate-like member supported by said fixed component and located in closely spaced edge-to-edge relation with said first plate, coacting indicia on adjacent edge portions of said first plate and said plate-like member for providing a visual indication of the horizontal orientation of said movable component about said vertical axis, and means for mounting said plate-like member on said fixed component for selective and generally horizontal adjustment relative to said fixed component and said first plate thereby to enable the indicia on said plate-like member to be located in a predetermined position relative to the indicia on said first plate.

11. Apparatus as defined in claim 10 in which adjacent edge portions of said first plate and said plate-like member are formed with complementary curvatures, to accommodate tilting of said movable component about said vertical axis while keeping said edge portions in closely spaced edge-to-edge relation.

12. Apparatus as defined in claim 11 in which the edge portions of said first plate and said plate-like member are formed with arcuate convex and concave curvatures, respectively.

13. Apparatus as defined in claim 12 in which said curvatures are struck about a center lying on said vertical axis.

* * * * *